(12) United States Patent (10) Patent No.: US 9,234,302 B2
Weber et al. (45) Date of Patent: Jan. 12, 2016

(54) PROCESS FOR THE PREPARATION OF HYPERBRANCHED HOLLOW FIBERS

(75) Inventors: Martin Weber, Maikammer (DE); Volker Warzelhan, Weisenheim am Berg (DE); Tai-Shung Chung, Ann Arbor, MI (US); Natalia Widjojo, Singapore (SG)

(73) Assignees: BASF SE (DE); National University of Singapore, Singapore (SG)

( * ) Notice: Subject to any disclaimer, the term of this patent is extended or adjusted under 35 U.S.C. 154(b) by 758 days.

(21) Appl. No.: 13/504,717

(22) PCT Filed: Oct. 26, 2010

(86) PCT No.: PCT/EP2010/066141
§ 371 (c)(1),
(2), (4) Date: Apr. 27, 2012

(87) PCT Pub. No.: WO2011/051273
PCT Pub. Date: May 5, 2011

(65) Prior Publication Data
US 2012/0213998 A1 Aug. 23, 2012

(30) Foreign Application Priority Data
Oct. 29, 2009 (EP) ..................................... 09174444

(51) Int. Cl.
*D01F 6/60* (2006.01)
*D01F 6/62* (2006.01)
(Continued)

(52) U.S. Cl.
CPC .............. *D01D 5/24* (2013.01); *B01D 67/0011* (2013.01); *B01D 69/085* (2013.01);
(Continued)

(58) Field of Classification Search
CPC .............. D01D 4/02; D01D 5/06; D01D 5/24

USPC .............. 264/177.14, 178 F, 183, 184, 209.1, 264/209.3
See application file for complete search history.

(56) References Cited

U.S. PATENT DOCUMENTS 3,767,756 A * 10/1973 Blades .......................... 264/184
5,181,940 A * 1/1993 Bikson et al. ..................... 95/47
(Continued)

FOREIGN PATENT DOCUMENTS

DE 19511150 A1 10/1996
EP 0341978 A2 11/1989
(Continued)

OTHER PUBLICATIONS

Yang, et al., "Rheological Investigations of Linear and Hyperbranched Polyethersulfone Towards Their As-Spun Phase Inversion Membranes' Differences", Polymer, vol. 50, (2009), pp. 524-533.
(Continued)

*Primary Examiner* — Leo B Tentoni
(74) *Attorney, Agent, or Firm* — Drinker Biddle & Reath LLP (57) ABSTRACT

The invention relates to a process for the preparation of a hollow filament (F) based on one or several molten or dissolved hyperbranched polymers (P) and potentially one or several further polymers (FP), characterized in that the molten or dissolved hyperbranched polymer (P) or the mixture of the hyperbranched polymer (P) with the further polymer (FP) is passed through one or several spinnerets (S), wherein the ratio between the spinneret die-length (L) and the die-channel (Delta-D) is between 0.1 and 9.5. The process can be applied for the preparation of hyperbranched polyethersulfone (HPES) hollow filaments.

16 Claims, 6 Drawing Sheets

(51) Int. Cl.

| | | |
|---|---|---|
| *D01D 5/24* | (2006.01) | |
| *B01D 67/00* | (2006.01) | |
| *B01D 69/08* | (2006.01) | |
| *B01D 71/78* | (2006.01) | |
| *D01D 4/02* | (2006.01) | |
| *D01D 5/06* | (2006.01) | |
| *D01F 6/66* | (2006.01) | |
| *D01F 6/76* | (2006.01) | |

(52) U.S. Cl.
CPC ............ *B01D 69/087* (2013.01); *B01D 71/78* (2013.01); *D01D 4/02* (2013.01); *D01D 5/06* (2013.01); *D01F 6/66* (2013.01); *D01F 6/76* (2013.01); *B01D 2323/06* (2013.01); *B01D 2323/22* (2013.01); *Y10T 428/2975* (2015.01)

(56) References Cited

U.S. PATENT DOCUMENTS

| | | | |
|---|---|---|---|
| 6,017,474 | A | 1/2000 | Teo et al. |
| 2004/0119187 | A1* | 6/2004 | Mattes et al. ............ 264/184 X |
| 2005/0069700 | A1* | 3/2005 | Chung et al. ................ 428/364 |
| 2005/0274665 | A1 | 12/2005 | Heilmann et al. |
| 2008/0009423 | A1* | 1/2008 | Mang et al. ................. 507/219 |
| 2010/0071557 | A1 | 3/2010 | Seiler et al. |
| 2010/0197859 | A1 | 8/2010 | Weber et al. |

FOREIGN PATENT DOCUMENTS

| | | |
|---|---|---|
| GB | 1340846 A | 12/1973 |
| JP | 2003-245524 A | 9/2003 |
| WO | WO-94/00222 A1 | 1/1994 |
| WO | WO-03/076056 A1 | 9/2003 |
| WO | WO-03/097221 A1 | 11/2003 |
| WO | WO-2008/077837 A1 | 7/2008 |
| WO | WO-2009030620 A1 | 3/2009 |

OTHER PUBLICATIONS

Widjojo, et al., "Elimination of Die Swell and Instability in Hollow Fiber Spinning Process of Hyperbranched Polyethersulfone (HPES) via Novel Spinneret Designs and Precise Spinning Conditions", Chemical Engineering Journal, vol. 163, (2010), pp. 143-153.

Hoelter, et al., "Degree of Branching Hyperbranched Polymers", Acta Polymer, vol. 48, (1997), pp. 30-35.

Albrecht, et al., "Preparation of Highly Asymmetric Hollow Fiber Membranes from Poly(Ether Imide) by a Modified Dry-Wet Phase Inversion Technique Using a Triple Spinneret", Journal of Membrane Science, vol. 262, (2005), pp. 69-80.

Gordeyev, et al., "Super-Selective Polysulfone Hollow Fiber Membranes for Gas Separation: Rheological Assessment of the Spinning Solution", Polymer, vol. 42, (2001), pp. 4347-4352.

International Search Report for PCT/EP2010/066141 mailed Sep. 21, 2011.

International Preliminary Report on Patentability of PCT/EP2010/066141, (mailed Mar. 30, 2012).

English translation of Japanese Office Action mailed Dec. 1, 2014 in Japanese Application No. 2012-535783.

* cited by examiner

PROCESS FOR THE PREPARATION OF HYPERBRANCHED HOLLOW FIBERS

CROSS-REFERENCE TO RELATED APPLICATIONS

This application is a national stage application (under 35 U.S.C. §371) of PCT/EP2010/066141, filed Oct. 26, 2010, which claims benefit of European application 09174444.1, filed Oct. 29, 2009.

The invention relates to a process for the preparation of hyperbranched hollow filaments and hollow fibers and particularly to a process for the preparation of hyperbranched polyethersulfone (HPES) hollow filaments and hollow fibers made thereof.

Fibers are often composed of one or several filaments. The primary material that is obtained e.g. after a spinning process is called a filament. Filaments can be converted to more defined filaments, e.g. fibers. Fibers can consist of one or more defined filaments. A hollow filament or fiber is a cylindrical filament or fiber that exhibits one or more hollows in its cross section. The importance of the preparation of hollow filaments or fibers and hollow fiber spinning e.g. for vast membrane applications is well recognized for decades. Hollow fiber membranes are of particular interest since they find applications in textile industry, chemistry or medicine (dialysis). To date, both melt and solution spinning are the most widely implemented techniques in hollow filament or fiber fabrication.

Due to the complexity of spinning processes, the understanding of material rheology and its flow behaviour through an orifice die are critical to obtain desirable hollow filaments or fibers at a reasonable production rate. From an economical point of view, the fiber production rate is one of the major parameters to determine maximum production capacity and profitability e.g. in the membrane industry. However, limitations caused by instabilities in the polymer flow lead to technical problems within the production line itself or fabricate undesirable final products which increase production costs.

Some issues encompassed within the hollow filament or fiber spinning instability include draw resonance, necking, capillary break-up, irregular cross section and melt fracture or extrudate distortion. Most of the mentioned phenomena lead to a breakage of the filament or fiber during the spinning process or generate a non-uniform cross-sectional diameter along the spun fibers. The spinning instability that characteristically shows up with melt fracture or extrudate distortion, normally takes place in the form of a distorted, gross or wavy polymer flow.

Advances in spinning technology and know-ledge on particular polymeric materials are the important keys to overcome the instability problems. Commonly used spinnerets for hollow filament or fiber spinning exhibit a ratio between the die-length (L) and the die-channel $\Delta D$ (which is deltaD), the so-called L/$\Delta D$, of approximate 10.

The die-channel is given by the following equation:

$$\text{delta}D = \Delta D = 0.5 \times (OD - ID)$$

wherein OD is the outer diameter and ID is the inner diameter.

DE-A 195 11 150 discloses an apparatus for multi-filament spinning of hollow fibers, like e.g. regenerated cellulose. Two fluids from the spinning stream are combined into a stream to be drawn through a precipitation bath and following baths, followed by drying and winding. The jets to form the hollow fibres have a channel filler to fill the interior of the hollow fibres after emerging from a capillary. The capillaries are in hollow zones of the jets with a centering and/or mounting. The hollow zones form a series of back-up zones, interlinked by flow sections with a narrow cross section. A conical end section is at the final back-up zone, with a transit in a parallel ring gap.

EP-A 0 341 978 discloses a hollow fiber with a plurality of members projecting from its outer surface in an arc turned back on itself. This hollow fiber is formed from a spinneret having a segmented orifice wherein each segment comprises a first portion in the form of an arc curved about the center of the orifice, a second portion extending from the first and connected to a third portion which is in the form of a reverse curve with respect to the first. Furthermore, the use of these hollow fibers for medicinal applications or textiles is mentioned.

In general, the extrudate flow behaviour is very much depending on the polymer material characteristics. In particular, the extrusion behaviour of linear and branched polymers with nearly identical viscosity functions show major qualitative flow distinctions. Generally, polymers with nearly identical viscosity functions demonstrate major flow distinctions. Polymers tend to relax by motion along their backbones. However, in branched polymers, this motion is hindered by branch points, thus the relaxation time increases dramatically. A flow instability caused by "die swell" and an extrudate distortion are the consequences. The magnification of polymer chain relaxation time can possibly amplify flow instability and also can be a major contributor to the die swell effect.

WO-A 2009/030620 discloses polymer mixtures on the basis of polyaryl ethers. Furthermore, this document relates to polymer membranes that contain the polyaryl ether mixture and to a method for producing the same and to the use of the polymer membranes containing the disclosed polyarylether material for the preparation of dialysis filters.

In recent years, polymers with highly branched structures are gaining popularity due to their large number of functional groups and high surface reactivity in contrast to their linear analogues. Among the various classes of branched polymers, hyperbranched materials, an outgrowths of the invention of dendrimers that have many short chains linked together and form a large polymer which average branch length is much smaller than the overall degree of polymerization, are considerably new materials. However, little is known of their rheological properties. Although much progress has been achieved in the structural understanding and the synthesis of hyperbranched materials, much of the fundamental understanding, especially the industrial application of these hyperbranched polymers, especially of hyperbranched hollow fibers, are still in the stage of infancy.

Yang et. al. (*Polymer*, Vol. 50, Issue 2, 16 Jan. 2009, Pages 524-533) investigated the macromolecular structure and rheological behavior of both, linear and hyperbranched polyethersulfone (PES) materials. Hyperbranched PES material is described to have a higher molecular weight and a wider molecular weight distribution than its linear analogue. Rheological studies disclose that polymer solutions made from the HPES/polyvinylpyrrolidone (PVP)/N-methyl-2-pyrrolidone (NMP) ternary system have a longer relaxation time than their linear counterparts. The less relaxation characteristics of the HPES dope not only result in a more pronounced die swelling during hollow fiber spinning, but also produce hollow fiber membranes with smaller pore sizes, narrower pore size distribution, and a smaller molecular weight cut-off (MWCO). In addition, elongational viscosity characterizations indicate that hyperbranched polyethersulfone (HPES) possesses a more strain hardening effect than linear polyethersulfone (LPES). As a result, films made from the former tend to break easier and quicker under high extensional strains than those made from the latter.

Two of the major underlying problems in the preparation of a hyperbranched hollow filaments or fibers are the die swell and the flow instability during the spinning process that make it impossible to efficiently prepare hyperbranched hollow filaments and fibers under known parameters. In order to solve this problem, new parameters have been developed.

It is one object of this invention to provide with a new process for the preparation of hollow filaments, based on hyperbranched polymers, in particular to a improved process which overcomes the disadvantages of prior art as described above. One advantage of the present invention is that the process effectively minimizes the die swell, flow instability and extrudate distortion in the hyperbranched polymer (P) during the hollow filament or fiber spinning.

The present invention is directed to a process for the preparation of a hollow filament (F) based on one or several molten or dissolved hyperbranched polymers (P) and potentially one or several further polymers (FP), characterized in that the molten or dissolved hyperbranched polymer (P) or the mixture of the hyperbranched polymer (P) with the further polymer (FP) is passed through one or several spinnerets (S), wherein the ratio between the spinneret die-length (L) and the die-channel (deltaD) is between 0.1 and 9.5.

It is also possible to use a solution of one or several hyperbranched polymers (P) in combination with one or several further polymers (FP) e.g. polyvinylpyrrolidone (PVP), polyamide (PA), polyethylenglycol (PEG), polyethyleneimine (PEI).

In a preferred embodiment of the invention the further polymer (FP) is amorph and/or is a high molecular polymer with a molecular weight of greater than 10.000 g/mol.

In another preferred embodiment of the invention only one hyperbranched polymer (P) is used in a solution without a further polymer (FP) for the preparation of hollow filaments (F).

In another preferred embodiment of the invention, one or several hyperbranched polymers (P) are used in combination with at least one further polymer (FP) for the preparation of hollow filaments (F).

The spinnerets (S) used according to the invention can have different geometries (G) and sizes. The spinnerets (S) can be made of metal, glass, plastic or other materials. Useful materials for spinnerets are known for the person skilled in the art.

In a preferred embodiment of the invention, the hyperbranched polymer (P) is selected from the group consisting of polyethersulfone, polyester, polyamide, polyolefin, polyurethane, polyimide and polyimide-amide, polyetherimide, polysulfone and polyacrylnitril. In principle, also other hyperbranched polymers can be used for the preparation of hollow filaments. In a preferred embodiment of the invention, the hyperbranched polymer (P) is a hyperbranched polyethersulfone.

Preferably, the degree of hyperbranching in the hyperbranched polymer (P) is between 0.2 and 8%. In particular, the degree of hyperbranching is from 0.4 to 6%, often, it is from 0.5 to 4%. In terms of the present invention the degree of hyperbranching in the hyperbranched polymer is the percentage (mol-%) of the hyperbranched units in relation to the total quantity (mol-%) of polymer(s) excluding the polymer-solvents.

Preferably, the process for the preparation of a hollow filament according to the invention encompass the step, wherein the hyperbranched polymer (P) is dissolved in a protic solvent, in particular with a polymer concentration in the solution between 10 and 40 wt %, and then passed through one or several spinnerets (S).

The solvents wherein the hyperbranched polymer (P) can be dissolved preferably are selected from the group consisting of dimethylacetamide (DMAC), dimethylformamide (DMF), N-Methyl-2-pyrrolidon (NPM) and Dimethylsulfoxid (DMSO).

The solution can furthermore comprise polyvinylpyrrolidone (PVP) or one or several other hydrophilic polymers, preferably with molecular weights in the range of 600 and 1 Million Da. The weight percentages of these polymers in the solution preferably are from 1 to 20 wt %.

According to a preferred embodiment of the invention, the spinneret (S) used for the preparation of a hollow filament or fiber can have a geometry (G) that is selected from the group consisting of:
a) a straight channel geometry (GI),
b) a double-cone form geometry with an enlarged channel with an angle ($\alpha^{II}$) of 60° (GII),
c) a cone-form geometry with a conical exit with an angle ($\alpha^{III}$) of 60° (GIII),
d) a round form geometry with a round exit channel with an angle ($\alpha^{IV}$) of 30° (GIV).

The invention is further described with reference to the drawings.

The use of various types of dry-jet-wet-spinning apparatus (W) is known for the person skilled in the art. Other spinning apparatus can be used with the spinneret (S) with the geometries (GI), (GII), (GIII) and/or (GIV).

Figure 1:
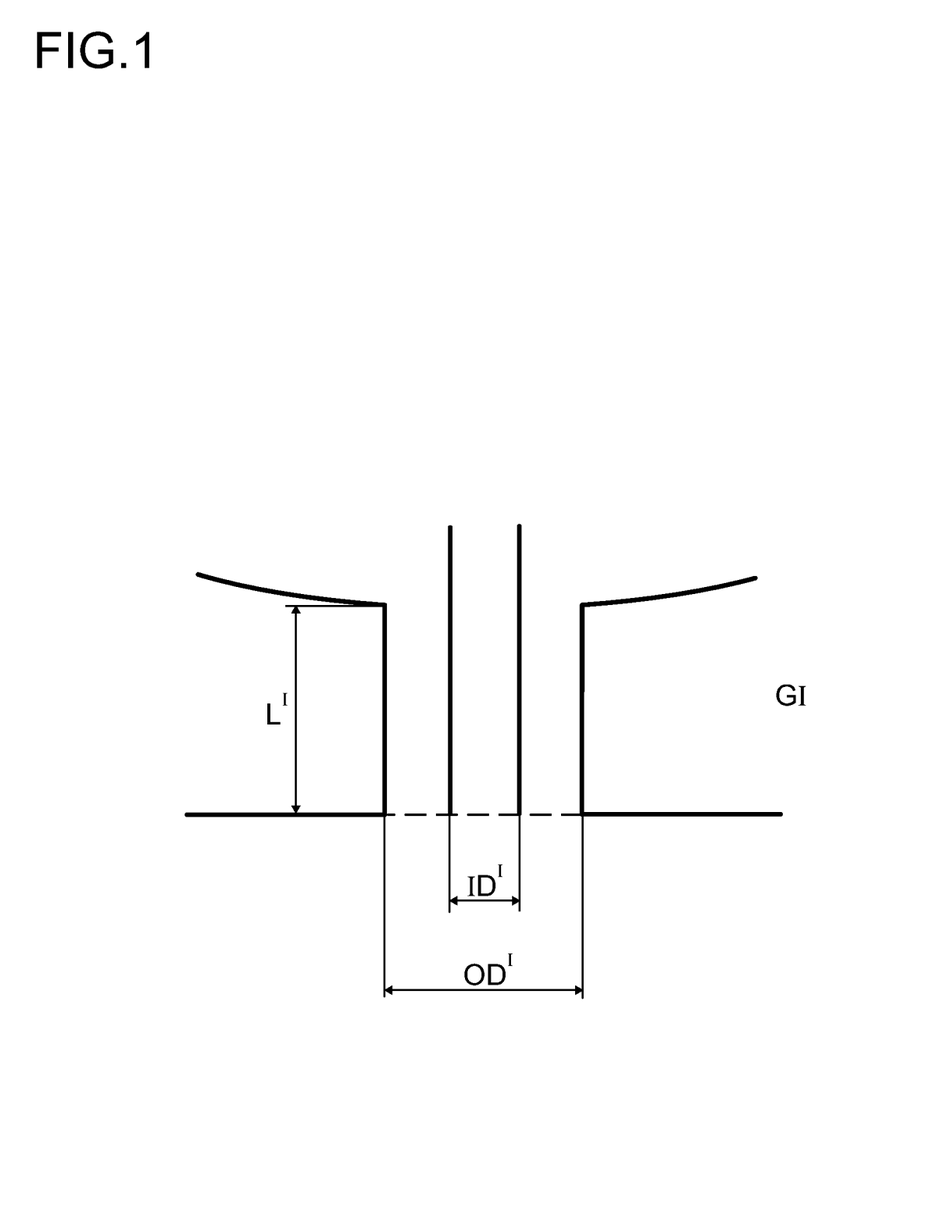
FIG. 1 shows a spinneret (S) with a straight channel geometry (geometry GI) with the die-length ($L^{I}$), the outer diameter ($OD^{I}$) which is the general outer diameter of the whole spinneret exit and the inner diameter ($ID^{I}$).

In a particular embodiment of the invention, the spinneret (S) with geometry (GI) has a die-length ($L^{I}$) between 0.2 to 4.5 mm and a $L^{I}$/Delta-$D^{I}$ ratio between 0.8 to 2.0.

Figure 2:
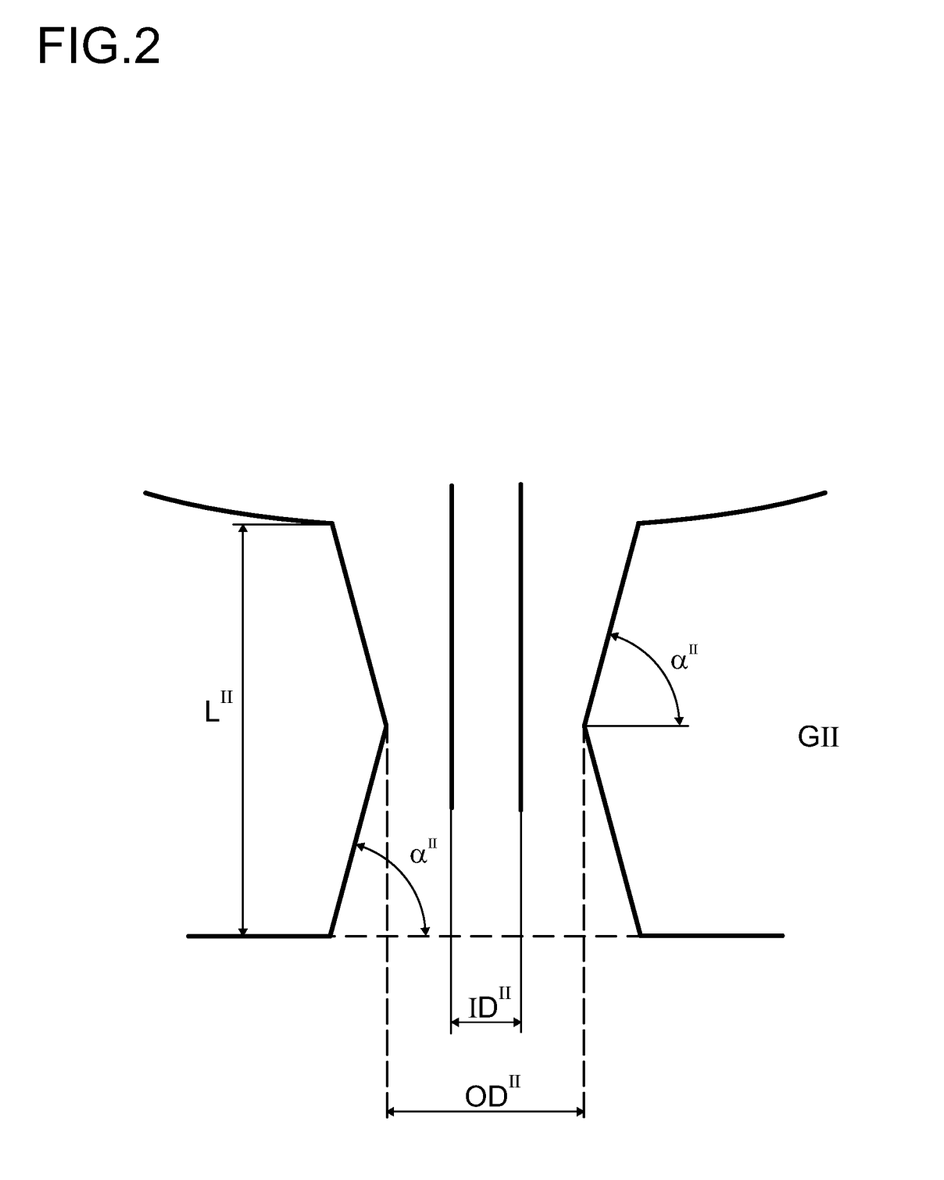
FIG. 2 shows a spinneret (S) with a double-cone form geometry with an enlarged channel (geometry GII) with the die-length ($L^{II}$), the outer diameter ($OD^{II}$), the inner diameter ($ID^{II}$) and with the angle ($\alpha^{II}$).

In another preferred embodiment, the spinneret (S) with geometry (GII) has a die-length ($L^{II}$) between 0.2 to 4.5 mm and a $L^{II}$/Delta-$D^{II}$ ratio between 1.2 to 3.0.

Figure 3:
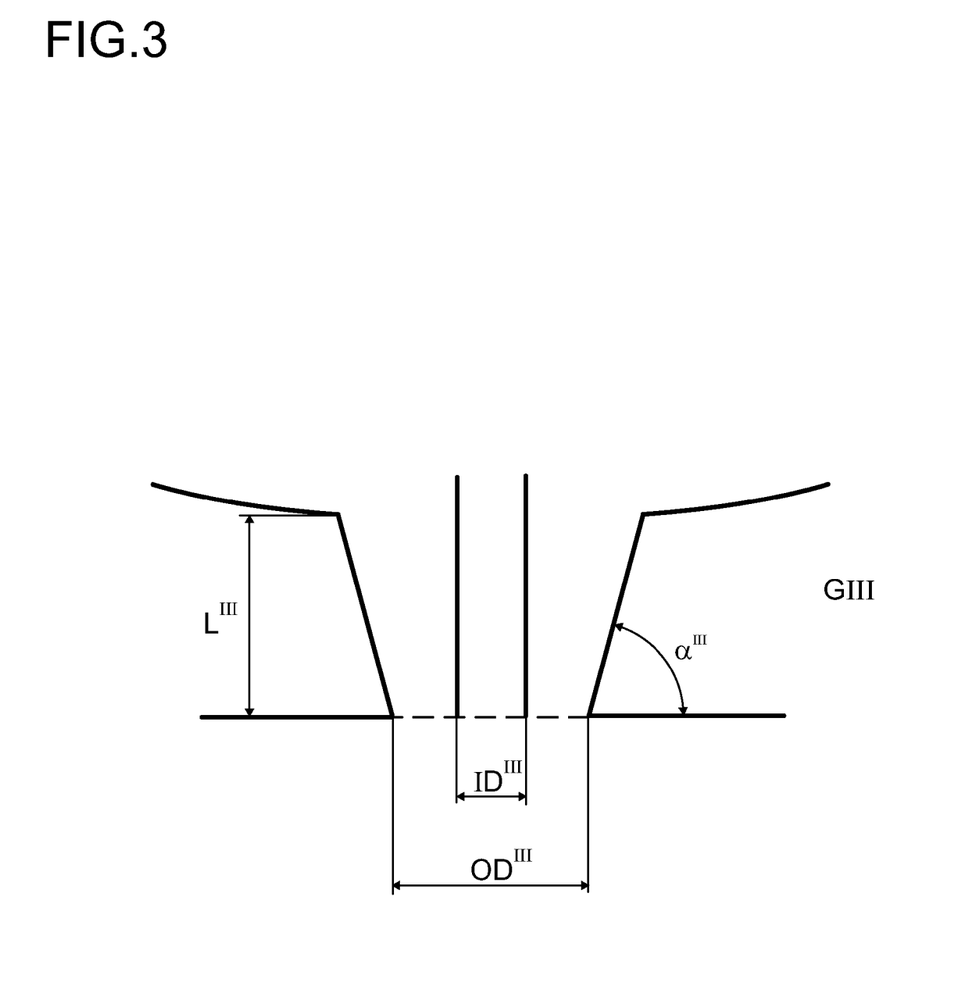
FIG. 3 shows a spinneret (S) with a cone-form geometry with a conical exit (geometry GIII) with the die-length ($L^{III}$), the outer diameter ($OD^{III}$), the inner diameter ($ID^{III}$) and with the angle ($\alpha^{III}$).

In a particular embodiment of the invention, the spinneret (S) with geometry (GIII) has a die-length ($L^{III}$) between 0.2 to 4.5 mm and a $L^{III}$/Delta-$D^{III}$ ratio between 1.1 to 2.

Figure 4:
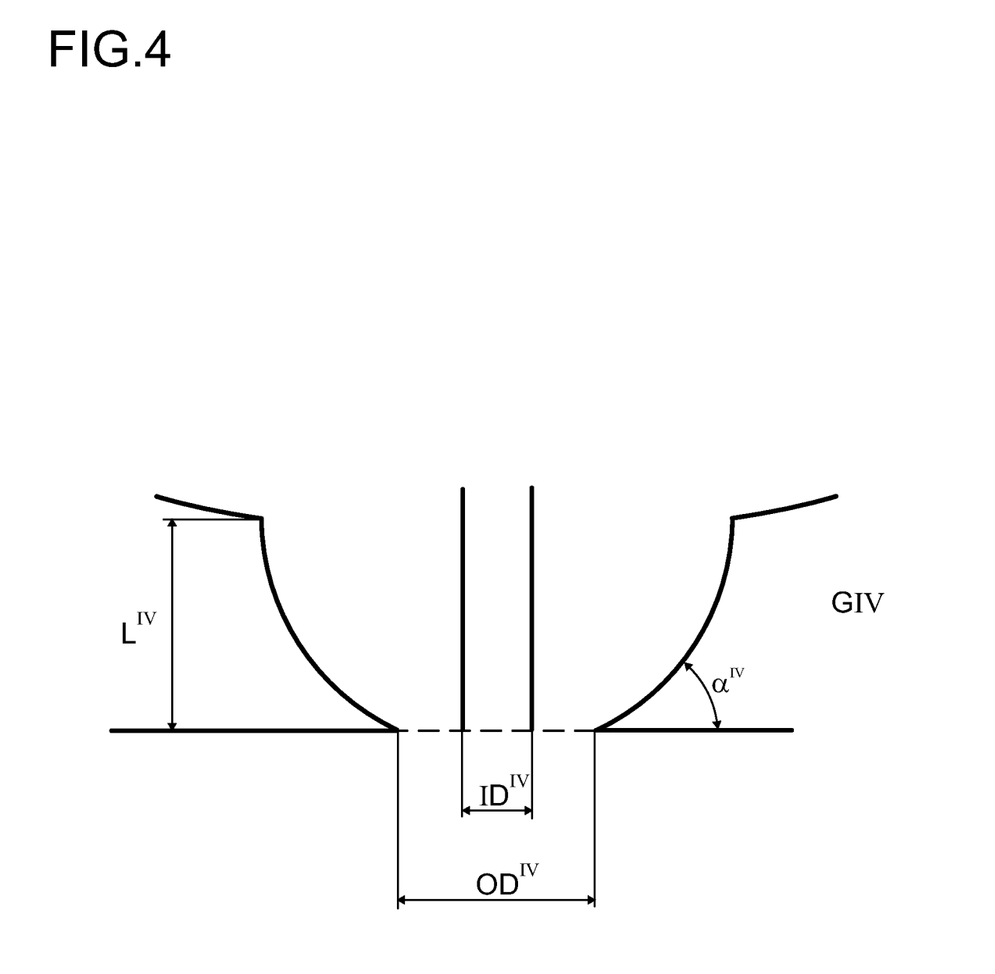
FIG. 4 shows a spinneret (S) with a round form geometry with a round exit channel (geometry GIV) with the die-length ($L^{IV}$), the outer diameter ($OD^{IV}$), the inner diameter ($ID^{IV}$) and with the angle ($\alpha^{IV}$).

Preferably, the spinneret (S) with geometry (GIV) has a die-length ($L^{IV}$) between 0.2 to 4.5 mm and a $L^{IV}$/Delta-$D^{IV}$ ratio between 1.1 to 2.

In a preferred embodiment of the process for the preparation of a hollow filament the following steps are included:
a) dissolving of a hyperbranched polymer (P) in a polar solvent with or without the addition of polyvinylpyrrolidone (PVP),
b) transferring the dissolved hyperbranched polymer (P) into the vessel (V) of a dry-jet-wet-spinning apparatus (W),
c) passing the dissolved hyperbranched polymer (P) through one or several spinnerets (S) of the geometry (GI), (GII), (GIII) or (GIV),
d) leading the extruded hyperbranched polymer (P) through an air gap (A) between 0.1 and 25 cm,
e) leading the extruded hyperbranched polymer (P) into a precipitation bath (B) and converting the extruded dissolved hyperbranched polymer (P) to a primary hollow filament (F1),
f) diverting of the primary hollow filament (F1) in the precipitation bath (B),
g) diverting of the hollow filament (F) outside of the precipitation bath (B),
h) drying of the hollow filament (F).

The non-solvent used for the precipitation bath (B) can be a linear or branched alcohol (e.g. a $C_2$ to $C_{10}$-alcohol) or another protic non-solvent. In a preferred embodiment, the non-solvent taken for the precipitation bath (B) is isopropanol (IPA). The non-solvents also can be a mixture of two or more protic non-solvents.

The air gap (A) is defined as the distance between the spinneret-exit and the precipitation bath (B).

The viscosity of the molten or dissolved hyperbranched polymer (P) during the process often is between 15 and 30 Pa*s. Depending on the polymers used for the preparation of hollow filaments, the viscosity can also be below 15 Pa*s or higher than 30 Pa*s.

Preferably in step c) of the process described above, a bore fluid composition is used. The bore fluid composition is defined in terms of the present invention as a composition of a fluid taken for the produced hollow in the hollow filament during the spinning process. In particular the bore fluid passes the inner hollow (inner diameter ID)) of the spinneret (S), preferably with bore fluid flow rate in the range of 1 to 2 ml/min. Several types of bore fluids are known in the art. The bore fluid compositions in the process can e.g. comprise of 0 to 90 wt % of the solvent N-methyl-2-pyrrolidone (NMP) in water or of pure water. Preferably the bore fluid used in the process described above consists of 10 to 90 wt % of NMP and 10 to 90 wt % of water.

The preferred compositions of bore fluids are non-solvent rich bore fluid compositions. Preferably they can contain from 100 wt % to 20 wt % water for example with the use of spinnerets (S) with the geometries (GIII) or (GIV). Also other bore fluid mixtures are possible.

The steps a) to c) of the process can be carried out at various spinning temperatures. The spinning temperature in the process for the preparation of a hollow filament (and in particular step c)) preferably is from 25° C. to 150° C. The preferred temperature range is from 50° to 100° C.

The primary hollow filament (F1) and the hollow filament (F) in the steps e) to g) of the process can taken up with a take-up speed that is defined as the speed to be taken for taking up the prepared primary hollow filament (F1) after the hyperbranched polymer (P) is pressed through the spinneret (S), lead through an air gap (A) and lead into a precipitation bath (B). The take up speed in the process for the preparation of a hollow filament (F) can vary e.g. from 1 to 80 m/min. The preferred take-up speed is from 5 to 40 m/min, more preferred from 6 to 10 m/min. Often a take-up speed of greater than 8 m/min is used.

The hollow filaments (F) prepared according to a process as described in the present invention can be used e.g. for the preparation of various polymer products. Further, the present invention is directed to the use of hollow filaments (F) prepared (or obtainable) according to a process described in the present invention. In a preferred embodiment of the present invention, the hollow filaments (F) prepared according to a process as described, are used for the preparation of fibres and/or membranes.

Hollow filaments (F) can be prepared by a process according to the present invention. Further, the present invention is directed to hollow filaments (F) prepared (or obtainable) according to a process described in the present invention. The hollow filaments (F) or hollow fibers can be used for the preparation of membranes that can be applied e.g. in medicine, e.g. as membrane-type artificial kidneys and plasma separators, as gas-separator, for micro-, ultra-, or nano-filtration or in textile industry. Besides, an application in waste water treatment, drinking water purification or in biochemical engineering is possible.

The invention is illustrated by the following examples.

EXAMPLES

Example 1

This example describes the utilization of various spinneret designs to minimize die swell and extrudate distortion in hyperbranched polyethersulfone (HPES) hollow fiber spinning.

A linear polyethersulfone (LPES) product (Ultrason® E6020P of BASF SE) as taken for the experiments composed of 100 mol % linear units.

A hyperbranched polyethersulfone (HPES) as taken for the experiments composed of 2 mol % branching units (2% hyperbranching degree) and 98 mol % linear units, was supplied by BASF SE, Germany. Both, LPES and HPES, were used separately and compared and described in the following examples. Their chemical structures are shown in the following scheme.

N-methyl-2-pyrrolidone (NMP) (from Merck, Singapore), isopropanol (IPA) (Merck, Singapore) and polyvinylpyrrolidone (PVP) (Merck, Singapore) with an average $M_W$ of 369,000 Da were employed as a solvent, coagulant, and additive, respectively, for hollow fiber spinning. For dope solution preparation, linear polyethersulfone (LPES), hyperbranched polyethersulfone (HPES) and polyvinylpyrrolidone (PVP) powders were dried at about 120° C. in a vacuum oven overnight to remove the moisture.

Certain amount of dried LPES or HPES was then dissolved slowly into a chilled NMP according to the desired weight percentage. PVP was added to the polymer dope solution to make its final composition constant at 16/10/74 wt % polyethersulfone (PES)/PVP/NMP. The polymer solutions were stirred continuously at least 1 day before hollow fiber spinning to remove bubbles.

Thereafter, a dry-jet-wet spinning process was conducted with detailed spinning conditions as listed in Table 1.

The chemical structures of:

(A) Linear polyethersulfone (LPES);
(B) Hyperbranched polyethersulfone (HPES);
(C) Polyvinylpyrrolidone (PVP),
wherein n is a number >1.

Figure 6:
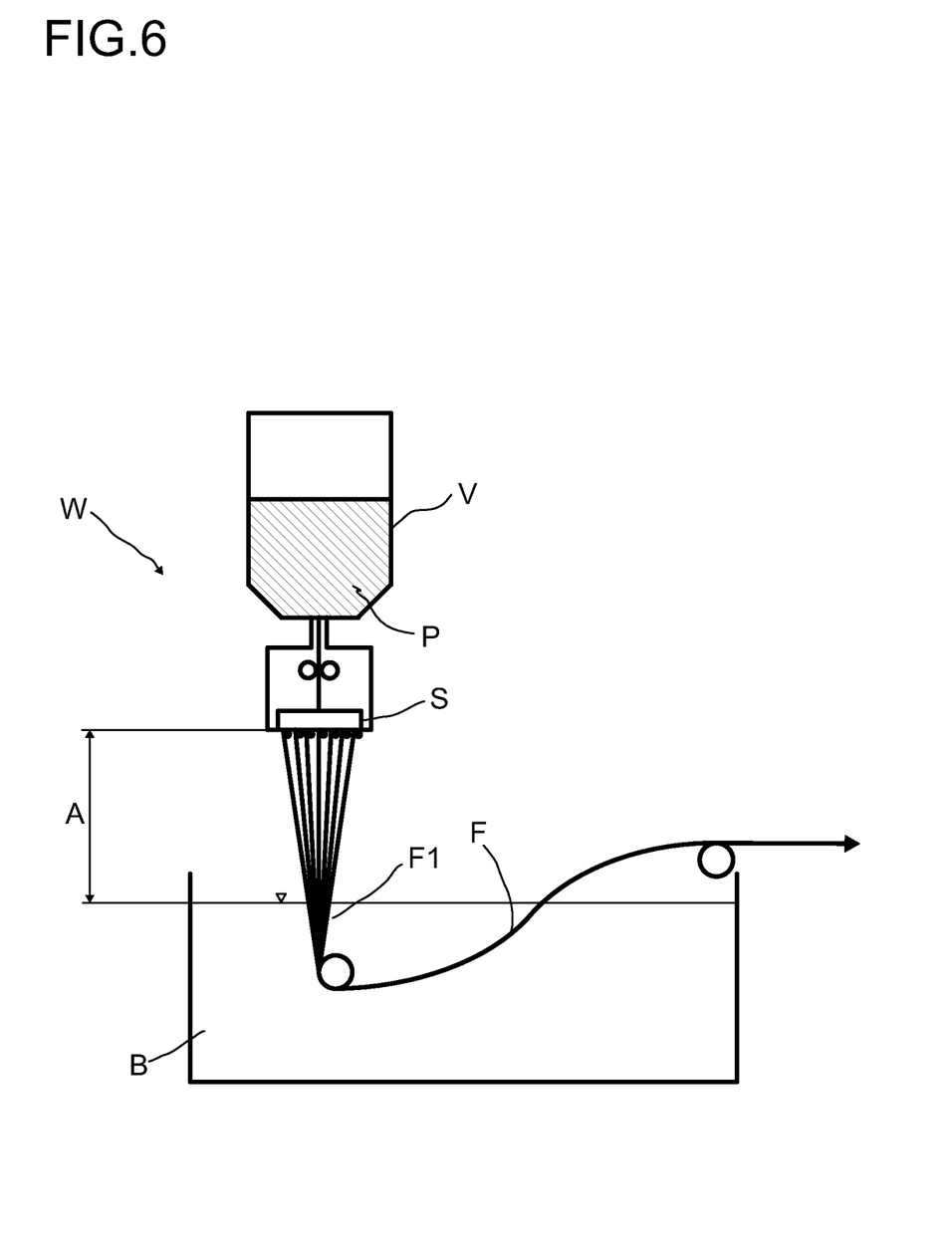
FIG. 6 shows a common dry-jet-wet-spinning apparatus (W) with the dissolved hyperbranched polymer (P) inside a vessel (V), the spinnerets (S) where the dissolved hyperbranched polymer (P) is passed through, the air gap (A), the precipitation bath (B), the primary hollow filament (F1) and the obtained hollow filament (F).

FIG. 6 shows a typical dry-jet-wet-spinning apparatus. The dope solution and bore-fluid were extruded at a specified flow rate through a spinneret using two ISCO syringe pumps. The nascent fibers exiting from the spinneret were snapshot by a Canon EOS 350D digital camera equipped with a micro lens (MP-E 65 mm/f/2.8 1-5×) and the pictures were evaluated to compare the results.

TABLE 1

Spinning parameters of HPES and LPES fiber membranes

| Spinning parameter | Condition |
|---|---|
| Dope composition (wt %) | 16/10/74 (polymer/PVP/NMP)* |
| Dope flow rate (ml/min) | 2 |
| Bore fluid composition (wt %) | 55/45 (NMP/Water) |
| Bore fluid flow rate (ml/min) | 1.5 |
| Air gap length (cm) | 20 |
| External coagulant (wt %) | Pure IPA |
| Spinning temperature (° C.) | 25 |
| Humidity (%) | 60 |
| Take up speed (m/min) | 5.8 (Free fall) |
| Spinneret (geometry) | GI, GII, GIII, GIV, G0 |

*polymers are HPES and LPES

The used spinnerets of geometry GI, GII, GIII, GIV and G0 are shown in FIGS. 1 to 5. The spinnerets used have the following dimensions (see Table 2):

TABLE 2

Dimensions of used spinnerets

| Spinneret (geometry) | Length (L) [mm] | Outer diameter (OD)[mm] | Inner Diameter (ID) [mm] |
|---|---|---|---|
| GI | 0.6 | 0.8 | 0.5 |
| GII | 1.2 | 0.8 | 0.5 |
| GIII | 0.6 | 0.8 | 0.5 |
| GIV | 0.6 | 0.8 | 0.5 |
| G0 | 5 | 0.8 | 0.5 |

LPES and HPES polymer solutions with similar dope viscosity were extruded through spinnerets (S) with various designs. In comparison among spinneret designs, the spinneret (S) with geometry (GII) results in the most pronounced die swell for both LPES and HPES polymer solutions. In term of flow stability, it appears that the flow stability is enhanced in the spinneret (S) with the geometry (GIII) and (GIV) in comparison with that of the common spinneret (S) with geometry (G0) and the spinneret (S) with geometry (GI). In conclusion, the spinnerets (S) with the geometry (GIII) and (GIV) show the most improved flow stability as well as less die swell compared to the other spinneret designs due to reduced overall shear stress and enhanced compression stress.

Example 2

This example describes the optimization of bore fluid composition to minimize die swell and extrudate distortion in the HPES hollow fiber spun with various spinneret designs. The dimensions of the used spinnerets (S) with different geometries are the same as in example 1 and shown in Table 2.

Since it is known that the variation of the fluid compositions plays an important role in the die swell and extrudate distortion of HPES spinning, similar spinning conditions as shown in Table 3 and various spinneret designs as illustrated in FIG. 1 to FIG. 5 were utilized to conduct spinning to optimize bore fluid compositions which in turn can minimize die swell and extrudate distortion.

Figure 5:
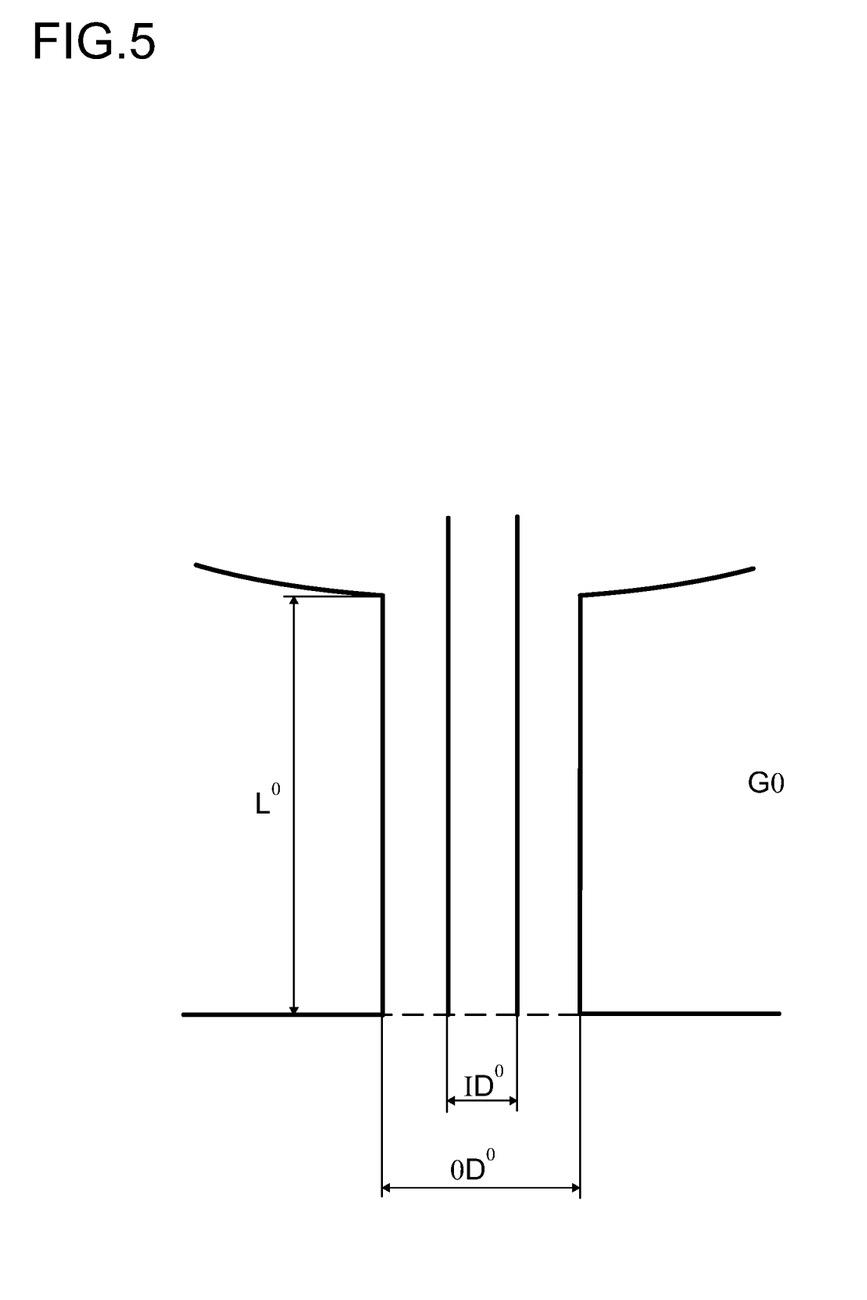
FIG. 5 shows a common spinneret (geometry G0) with the die-length ($L^{0}$), the outer diameter ($OD^{0}$) and the inner diameter ($ID^{0}$).

It could be noticed that the flow instability in the extrusion of HPES dope solution can be observed in all ranges of bore fluid composition for fibers spun with the common spinneret (S) of geometry (G0) and the spinneret (S) with the geometry (GI). However, an interesting finding can be noticed in these two spinnerets. A more pronounced flow instability in the extruded HPES dope solution can be observed when the content of solvent (NMP) in the bore fluid increases from 55 to 90 wt %. Hence, it can be inferred that there is a critical bore fluid composition to achieve a relatively better flow stability during fiber spinning using the common spinneret (S) with geometry (G0) and the spinneret (S) with geometry (GI).

TABLE 3

Spinning parameters of HPES hollow fiber membranes

| Spinning parameter | Condition |
| --- | --- |
| Dope composition (wt %) | 16/10/74 (polymer/PVP/NMP)* |
| Dope flow rate (ml/min) | 2 |
| Bore fluid composition (wt %) | 0/100 (NMP/Water) |
| | 30/70 (NMP/Water) |
| | 55/45 (NMP/Water) |
| | 80/20 (NMP/Water) |
| | 90/10 (NMP/Water) |
| Bore fluid flow rate (ml/min) | 1.5 |
| Air gap length (cm) | 20 |
| External coagulant (wt %) | Pure IPA |
| Spinning temperature (° C.) | 25 |
| Humidity (%) | 60 |
| Take up speed (m/min) | 5.8 (Free fall) |
| Spinneret (geometry) | GI, GII, GIII, GIV, G0 |

*polymers are HPES and LPES

In the view of die swell effect, the bore fluid composition seems to have a limited effect on the die swell in the HPES extrusion using the common spinneret (S) with geometry (G0) or the spinnerets (S) with the geometries (GI), (GIII) and (GIV). However, in the modified spinneret (S) with geometry (GII), a pronounced die swell was observed at the HPES extrusion spun with bore fluid 90/10 wt % NMP/water. However, this severe die swell and flow distortion can be significantly eliminated when the bore fluid composition reduces to 10/90 wt % NMP/water. This indicates that the chain relaxation under a constrained boundary within the diverging section and the bore fluid chemistry play important roles on the die swell and flow stability of the spinneret with geometry (GII). On the other hand, the spinnerets (S) with the geometries (GIII) and G(IV) demonstrate stable flows in various bore fluid compositions.

Thus, it is emphasized that designing spinnerets with proper geometry and selecting suitable spinning conditions provide an effective solution to subdue this instability phenomenon.

Example 3

This example describes the combination of proper die geometry design and optimum spinning parameters to suppress die swell and extrudate distortion in the HPES hollow fiber spinning. The dimensions of the used spinnerets (S) with different geometries are the same as in example 1 and shown in Table 2.

Another viable approach to reduce die swell and flow instability was done by adjusting the take-up speed. The take-up speed in the fiber spinning is a crucial parameter which plays an important role on hollow fiber dimension and morphology because of the external work (or elongational stress) on the as-spun fibers.

This work (or stress) along spinning direction may counterbalance the instability force in the transversal direction, thus align the polymer chains in the spinning direction and suppress the flow instability and smoothen any distortion. As a result, it can be expected that less die swell and better flow instability can be achieved. The parameters are listed in Table 4.

As a result, it was observed that when a higher take-up speed spinning is carried out, both die swell and flow instability can be reduced prominently. This tendency applies for all spinneret designs with geometries (GI), (GII), G(III), G(IV) and (G0). Furthermore, a combination of high take-up speed spinning and non-solvent rich bore fluid composition shows an effective strategy to reduce die swell and enhance flow stability. In this case, the spinnerets (S) with the geometries (GIII) and (GIV) were chosen for further studies due to its most stable flow. The as-spun nascent fibers show no die-swell as well as excellent flow stability. The fibers spun with NMP/water (55/45 wt %) as bore fluid at a higher take-up rate exhibit a slight die-swell with enhanced flow stability as compared to the fibers spun under free fall conditions.

TABLE 4

Spinning parameters of HPES hollow fiber membranes

| Spinning parameter | Condition |
| --- | --- |
| Dope composition (wt %) | 16/10/74 (polymer/PVP/NMP)* |
| Dope flow rate (ml/min) | 2 |
| Bore fluid composition (wt %) | 0/100 (NMP/Water) |
| | 55/45 (NMP/Water) |
| Bore fluid flow rate (ml/min) | 1.5 |
| Air gap length (cm) | 20 |
| External coagulant (wt %) | Pure IPA |
| Spinning temperature (° C.) | 25 |
| Humidity (%) | 60 |
| Take up speed (m/min) | 5.8 (Free fall) |
| | 8 |
| Spinneret (geometry) | GI, GII, GIII, GIV, G0 |

*polymers are HPES and LPES

All in all, it can be highlighted that the use of the spinnerets (S) with the geometries (GIII) and (GIV) which exhibits the most stable flow among all spinnerets (S) in conjunction with a proper selection and combination of bore fluid composition and take-up speed is important in counteracting the die swell of spinning HPES materials as well as enhancing their hollow fiber spinning stability.

The invention claimed is:

1. A process for the preparation of a hollow filament (F) based on one or several molten or dissolved hyperbranched polymers (P) and potentially one or several further polymers (FP), wherein the molten or dissolved hyperbranched polymer (P) or the mixture of the hyperbranched polymer (P) with the further polymer (FP) is passed through one or several spinnerets (S), wherein the ratio between the spinneret die-length (L) and the die-channel (deltaD) is between 0.1 and 9.5.

2. The process according to claim 1, wherein the hyperbranched polymer (P) is selected from the group consisting of polyethersulfone, polyester, polyamide, polyolefin, polyurethane, polyimide, polyimide-amide, polyetherimide, polysulfone and polyacrylnitrile.

3. The process according to claim 1, wherein the hyperbranched polymer (P) is a hyperbranched polyethersulfone.

4. The process according to claim 1, wherein the degree of hyperbranching in the hyperbranched polymer (P) is between 0.2 and 8%.

5. The process according to claim 1, wherein the hyperbranched polymer (P) is dissolved in a protic solvent with a polymer concentration in the solution between 10 and 40 wt % and then passed through one or several spinnerets (S).

6. The process according to claim 1, wherein the spinneret (S) has a geometry (G) that is selected from the group consisting of:
   a) a straight channel geometry (GI),
   b) a double-cone form geometry with an enlarged channel with an angle ($\alpha^{II}$) of 60° (GII),
   c) a cone-form geometry with a conical exit with an angle ($\alpha^{III}$) of 60° (GIII), and
   d) a round form geometry with a round exit channel with an angle ($\alpha^{IV}$) of 30° (GIV).

7. The process according to claim 6, wherein the spinneret (S) with geometry (GI) has a die-length ($L^I$) between 0.2 to 4.5 mm and a $L^I$/Delta-$D^I$ ratio between 0.8 to 2.0.

8. The process according to claim 6, wherein the spinneret (S) with geometry (GII) has a die-length ($L^{II}$) between 0.2 to 4.5 mm and a $L^{II}$/Delta-$D^{II}$ ratio between 1.2 to 3.0.

9. The process according to claim 6, wherein the spinneret (S) with geometry (GIII) has a die-length ($L^{III}$) between 0.2 to 4.5 mm and a $L^{III}$/Delta-$D^{III}$ ratio between 1.1 to 2.

10. The process according to claim 6, wherein the spinneret (S) with geometry (GIV) has a die-length ($L^{IV}$) between 0.2 to 4.5 mm and a $L^{IV}$/Delta-$D^{IV}$ ratio between 1.1 to 2.

11. The process according to claim 1, wherein the process includes the following steps:
   a) dissolving of the hyperbranched polymer (P) in a polar solvent with or without the addition of polyvinylpyrolidone (PVP),
   b) transferring the dissolved hyperbranched polymer (P) into a vessel (V) of a dry-jet-wet-spinning apparatus (W),
   c) passing the dissolved hyperbranched polymer (P) through one or several spinnerets (S) of the geometry (GI), (GII), (GIII) or (GIV),
   d) leading the extruded hyperbranched polymer (P) through an air gap (A) between 0.1 and 25 cm,
   e) leading the extruded hyperbranched polymer (P) into a precipitation bath (B) and converting the extruded dissolved hyperbranched polymer (P) to a primary hollow filament (F1),
   f) diverting of the primary hollow filament (F1) in the precipitation bath (B),
   g) diverting of the hollow filament (F) outside of the precipitation bath (B), and
   h) drying of the hollow filament (F).

12. The process according to claim 1, wherein the viscosity of the molten or dissolved hyperbranched polymer (P) during the process is between 15 and 30 Pa·s.

13. A method for the preparation of polymer products which comprises utilizing the hollow filaments (F) prepared according to the process as described in claim 1.

14. A method for the preparation of fibres and/or membranes which comprises utilizing the hollow filaments (F) prepared according to the process as described in claim 1.

15. The process according to claim 1, wherein the degree of hyperbranching in the hyperbranched polymer (P) is between 0.4 and 6%.

16. The process according to claim 3, wherein the degree of hyperbranching in the hyperbranched polymer (P) is between 0.5 and 4%.

* * * * *